Figure 1:
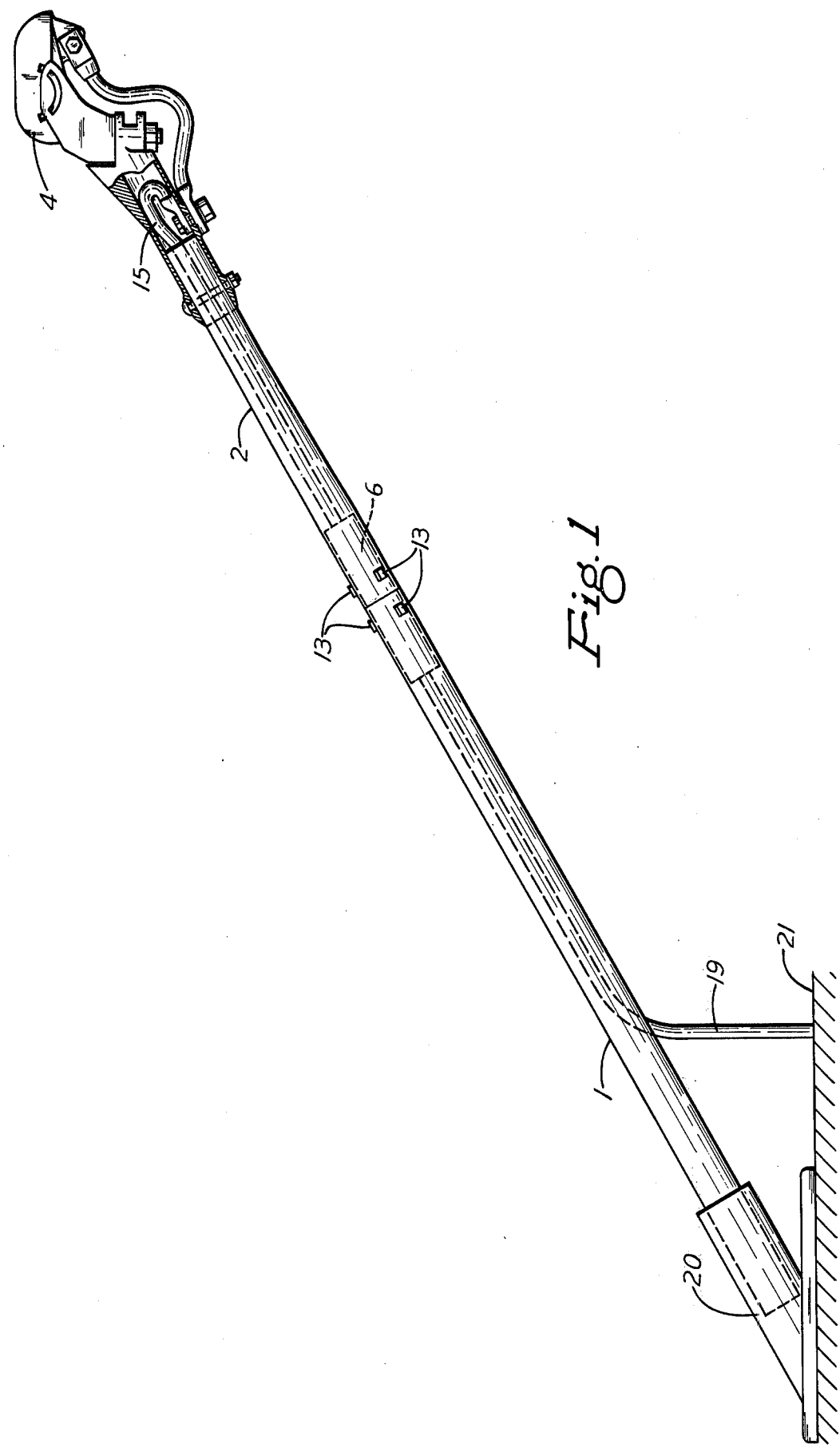

United States Patent [19]

Adler et al.

[11] 4,116,312
[45] Sep. 26, 1978

[54] MINE VEHICLE TROLLEY POLE

[75] Inventors: Stuart L. Adler, McMurray; William O'Neil Hunt, Pittsburgh, both of Pa.

[73] Assignees: Permali, Incorporated, Mount Pleasant; Shields Rubber Corporation, Pittsburgh, both of Pa.; part interest to each

[21] Appl. No.: 837,312

[22] Filed: Sep. 28, 1977

[51] Int. Cl.² .............................................. B60L 5/12
[52] U.S. Cl. ......................................... 191/64; 191/66
[58] Field of Search ....................... 191/64, 66, 85, 86; 339/147 R

[56] References Cited

U.S. PATENT DOCUMENTS

| 1,479,553 | 1/1924 | Parlow | 191/64 |
| 1,867,480 | 7/1932 | Tillinghast | 191/64 |
| 2,265,018 | 12/1941 | Arnold | 191/64 |

Primary Examiner—Trygve M. Blix
Assistant Examiner—Reinhard J. Eisenzopf
Attorney, Agent, or Firm—Brown, Flick & Peckham

[57] ABSTRACT

It is common practice to provide electrically propelled mine vehicles, such as locomotives, people carriers and shuttle-cars, with solid wooden trolley poles. The lower end of such a pole is mounted on the vehicle and the upper end carries a trolley shoe that slides along an electric power line or trolley wire suspended from the ceiling of the mine. An electric cable connects the shoe with the vehicle propulsion motor. The cable extends down the outside of the trolley pole, to which it is attached by tape or the like, as is also a fuse case.

8 Claims, 4 Drawing Figures

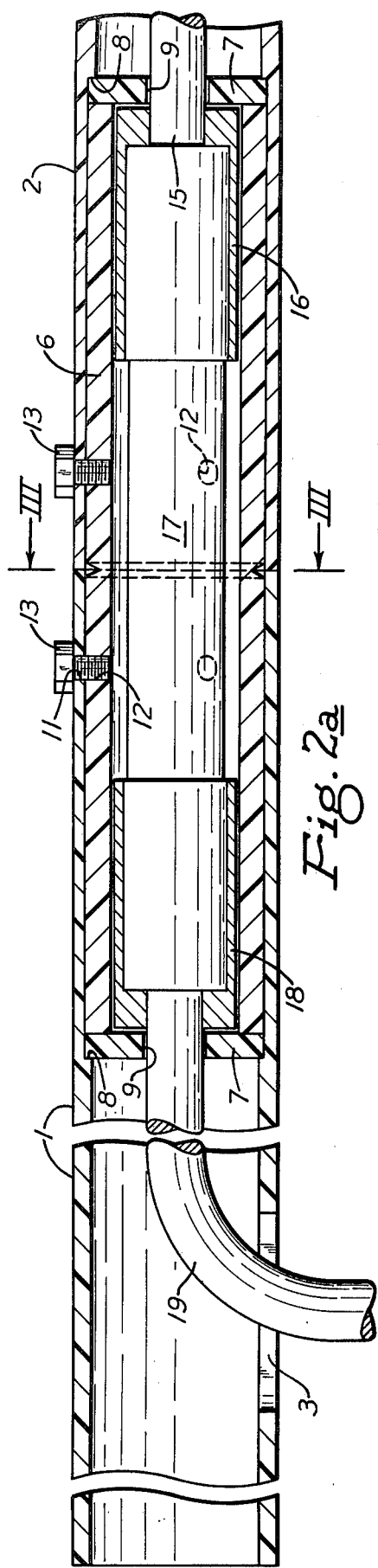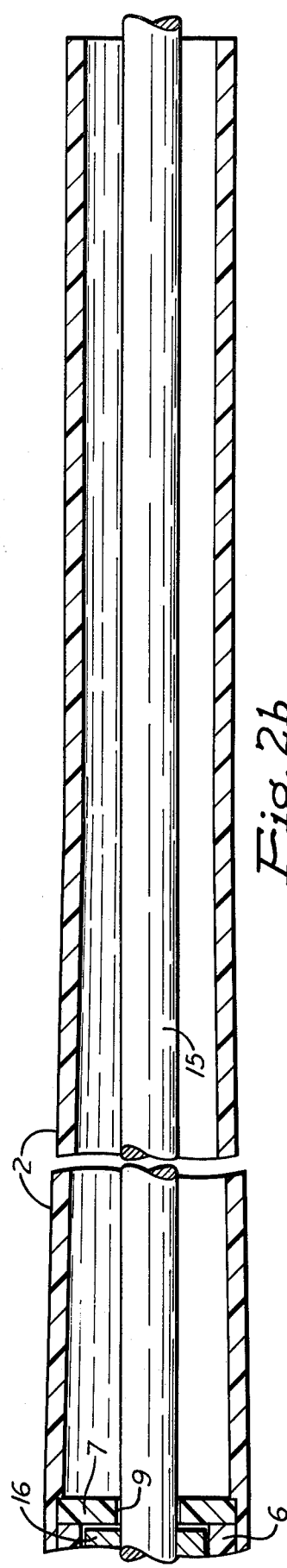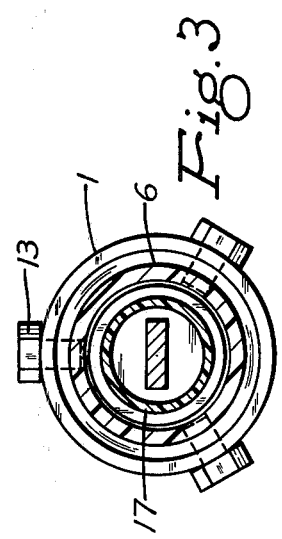

MINE VEHICLE TROLLEY POLE

There are several disadvantages of wooden trolley poles. For example, it is not unusual for them to be broken if they slip off the trolley wires and strike the mine roof, thereby requiring replacement of the entire pole. Natural defects, such as knots in the wood, add to the chance of breakage. Also, there is considerable strength variation from pole to pole. Wooden poles absorb moisture and may become conductors of electricity, and mine acid water due to leaks in a mine roof is known to damage them. The insulation on the exposed electrical conductor extending along the side of a pole is subject to damage by contact with foreign objects.

It is among the objects of this invention to provide a trolley pole which is hollow, which contains the electric cable and fuse case, which can be provided with uniform strength from pole to pole, which is difficult to break, which will not absorb moisture, which is resistant to corrosion and to mine acid water, which can be machine-made with predetermined physical properties, in which a damaged section can be replaced without replacing the entire pole, and in which only a minor part of the pole generally requires replacement if the pole is broken.

The preferred embodiment of the invention is illustrated in the accompanying drawings, in which FIG. 1 is a side view of the mine vehicle trolley pole, partly broken away in section;

FIGS. 2a and 2b are enlarged, fragmentary longitudinal sections of the pole; and FIG. 3 is a cross section taken on the line III—III of FIG. 2a.

Referring to the drawings, it is a feature of this invention that a tubular or hollow trolley pole is made from windings of fiberglass filaments that are drawn from a bath of suitable thermosetting resin, such as an epoxy or polyester and a curing agent. After the windings have been completed, the resin is cured by heat to form a rigid matrix around the glass filaments. The resin maintains the filaments in the proper position so that they can effectively bear the required mechanical loads. It also helps to distribute the load evenly among the filaments and protects them from abrasion and damage. Other advantages are that the resin is the most important factor in the control of electrical properties and the chemical resistance of the composite, and it provides all of the interlaminar shear strength of the structure. A trolley pole made in this manner is very strong.

The hollow pole is formed in two parts or sections that are then disposed end to end. The lower section 1, as viewed in FIG. 1, preferably is cylindrical, while the upper section 2 has cylindrical end portions joined by a tapered central portion. The lower end of this upper section has the same diameter as the lower section. The two sections are formed by winding the resin-coated fiberglass filaments on mandrels of the appropriate size and shape. After the hollow pole sections have been stripped from the mandrels the lower section is provided near its lower end with an opening 3 (FIG. 2a) in its side. The two parts of the pole then are connected end to end in a manner to be described, and a current collector shoe 4 (FIG. 1) that will run along a trolley wire is mounted on the upper end of the pole.

To hold the two sections of the pole together, they are telescoped over the opposite ends of a rigid cylindrical case containing a fuse. As shown in FIG. 2a, the side wall 6 of this case can be formed in the same way as the pole; from filament-wound fiberglass reinforced plastic. The ends of the case are formed by flat circular discs 7 made from laminated plastic. These discs engage the ends of the side wall of the case and radial shoulders 8 formed in the pole by increasing the internal diameter of the pole throughout the length of the case, which is done by providing the mandrels with corresponding enlarged portions. The discs are not fastened to the side wall of the case but are bonded to the inside of the pole and are provided with central openings 9 for electrical conductors. The pole fits snugly around the fuse case.

At opposite sides of the joint between the two sections of the pole they are provided with radial holes 11 that register with threaded holes 12 in the side of the fuse case. Cap screws 13 extend through the holes in the pole and are threaded into the holes in the case to hold the two parts of the pole together. Preferably, the cap screws are spaced 120° apart around the pole as shown in FIG. 3.

An electric cable 15 connected with the collector shoe extends down through the pole from its upper end and is connected to an electric contact in the form of a metal clip 16 inside the upper end of the fuse case. This clip tightly grips one end of a fuse 17, the opposite end of which is gripped by a like clip 18 positioned at the lower end of the case. This lower contact is connected to an electric cable 19 that extends down and out through the opening 3 in the side of the pole and to the electric motor that drives the vehicle on which the pole is mounted. The pole can be attached to the vehicle by setting the lower end of the pole in a socket 20 on the vehicle 21, as shown in FIG. 1.

In case a fuse is blown, the cap screws are removed and the two sections of the trolley pole are pulled away from the fuse case so that a new fuse can be inserted in it. The case and pole are then reassembled. If either section of the pole happens to be damaged, that section can be removed from the other section by removing the cap screws that attach it to the fuse case. A new pole section then can be substituted for the damaged section. To insure that if the upper end of the pole strikes something hard enough to break the pole, the break will occur at the joint between the two sections of the pole and not in either section, the side wall of the fuse case is reduced in thickness at that point in order to weaken it in that area. As a result, in most instances only the broken fuse case will have to be replaced.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. A mine vehicle trolley pole assembly comprising a hollow pole having upper and lower ends and an opening in the side of its lower portion, a trolley wire contact shoe mounted on the upper end of the pole, the pole being divided transversely into upper and lower sections, a fuse case fitting inside the pole and extending into both of said sections to connect them, a fuse contact disposed inside each end of said case, an electric cable extending from said shoe down through the hollow pole to the upper fuse contact, and a second electric cable extending from the lower fuse contact down through the hollow pole and out through said side opening, said pole being formed from a filament-wound fiberglass reinforced plastic.

2. A mine vehicle trolley pole assembly according to claim 1, in which said fuse case is formed from a filament-wound fiberglass reinforced plastic.

3. A mine vehicle trolley pole assembly according to claim 1, in which the insides of said pole sections are provided with a pair of radial shoulders facing each other, and the ends of said fuse case are formed from discs engaging said shoulders.

4. A mine vehicle trolley pole assembly according to claim 1, in which the insides of said pole sections are provided with a pair of radial shoulders facing each other, and the ends of said fuse case are formed from discs bonded to said shoulders, and each disc is provided with an opening through which the adjoining cable extends.

5. A mine vehicle trolley pole assembly according to claim 1, including removable fasteners extending through the sides of said pole sections and into said fuse case to hold the pole sections together.

6. A mine vehicle trolley pole assembly according to claim 5, in which the area of said fuse case beside the meeting ends of said pole sections is reduced in thickness to weaken the case at that point.

7. A mine vehicle trolley pole assembly according to claim 6, in which the insides of said pole sections are provided with a pair of radial shoulders facing each other, and the ends of said fuse case are formed from discs engaging said shoulders, each disc being provided with a central opening through which the adjoining cable extends.

8. A mine vehicle trolley pole assembly according to claim 1, in which said fuse case is provided beside both of said pole sections with threaded radial openings, said pole sections are provided with radial openings registering with said case openings, and cap screws extending through said pole openings and into the case openings.

* * * * *